(12) United States Patent
Kobayashi

(10) Patent No.: US 7,764,464 B2
(45) Date of Patent: Jul. 27, 2010

(54) THIN FILM MAGNETIC HEAD HAVING SOLENOIDAL COIL AND METHOD OF MANUFACTURING THE SAME

(75) Inventor: Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 490 days.

(21) Appl. No.: 11/329,351

(22) Filed: Jan. 10, 2006

(65) Prior Publication Data

US 2006/0152852 A1 Jul. 13, 2006

(30) Foreign Application Priority Data

Jan. 12, 2005 (JP) ............... 2005-004996

(51) Int. Cl.
  *G11B 5/17* (2006.01)
  *G11B 5/31* (2006.01)
(52) U.S. Cl. .............. 360/123.06; 360/123.05; 360/125.03
(58) Field of Classification Search ................. 360/123.01–125.75
See application file for complete search history.

(56) References Cited

U.S. PATENT DOCUMENTS

2004/0004786 A1* 1/2004 Shukh et al. ............. 360/126
2004/0012884 A1   1/2004 Sato et al.
2004/0100728 A1* 5/2004 Sato et al. ............... 360/123
2005/0128637 A1* 6/2005 Johnston et al. .......... 360/125
2006/0002021 A1* 1/2006 Li et al. .................. 360/126

FOREIGN PATENT DOCUMENTS

| JP | 59-119522   | 7/1984  |
| JP | 02-035614   | 2/1990  |
| JP | 2002-197615 | 7/2002  |
| JP | 2004-296062 | 10/2004 |
| JP | 2004-310975 | 11/2004 |

OTHER PUBLICATIONS

English translation of Office Action issued in corresponding Japanese Patent Application No. 2005-004996; issued Dec. 25, 2007.

\* cited by examiner

*Primary Examiner*—William J Klimowicz
(74) *Attorney, Agent, or Firm*—Brinks Hofer Gilson & Lione

(57) ABSTRACT

A film thickness of second coil layers (second coil pieces) disposed below a main magnetic pole layer (first magnetic layer) is larger than a film thickness of first coil layers (first coil pieces). Hence, while a magnetic path length of magnetic flux flowing through the main magnetic pole layer (first magnetic layer) and a return path layer (second magnetic layer) is decreased by decreasing the film thickness of the first coil layers (first coil pieces) disposed in a space between the main magnetic pole layer (first magnetic layer) and the return path layer (second magnetic layer), series resistance of an entire coil layer can be decreased by increasing the film thickness of the second coil layers (second coil pieces).

2 Claims, 15 Drawing Sheets

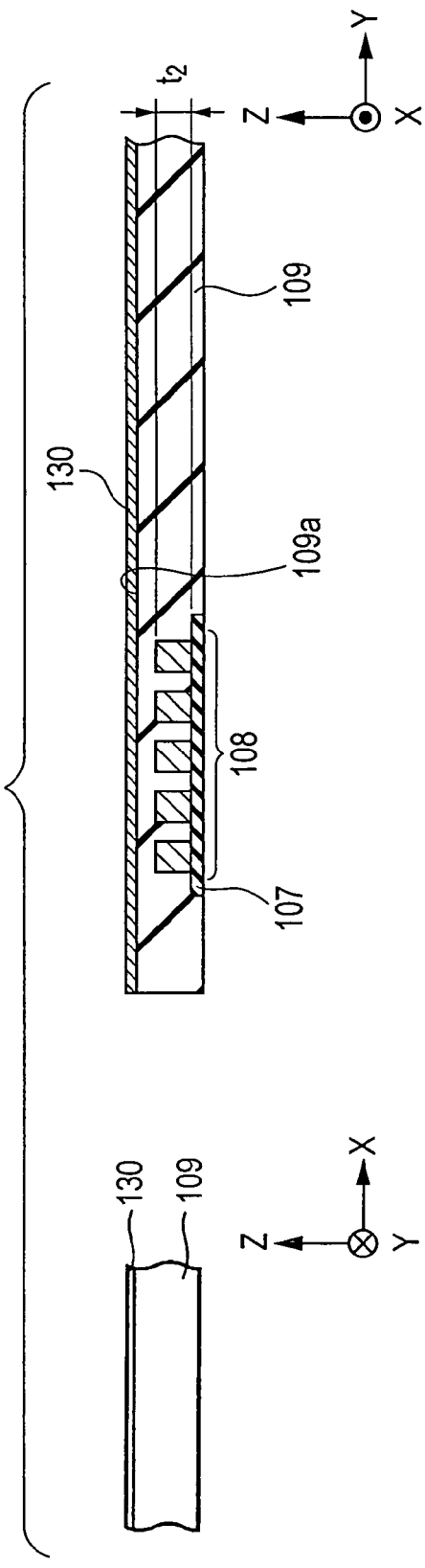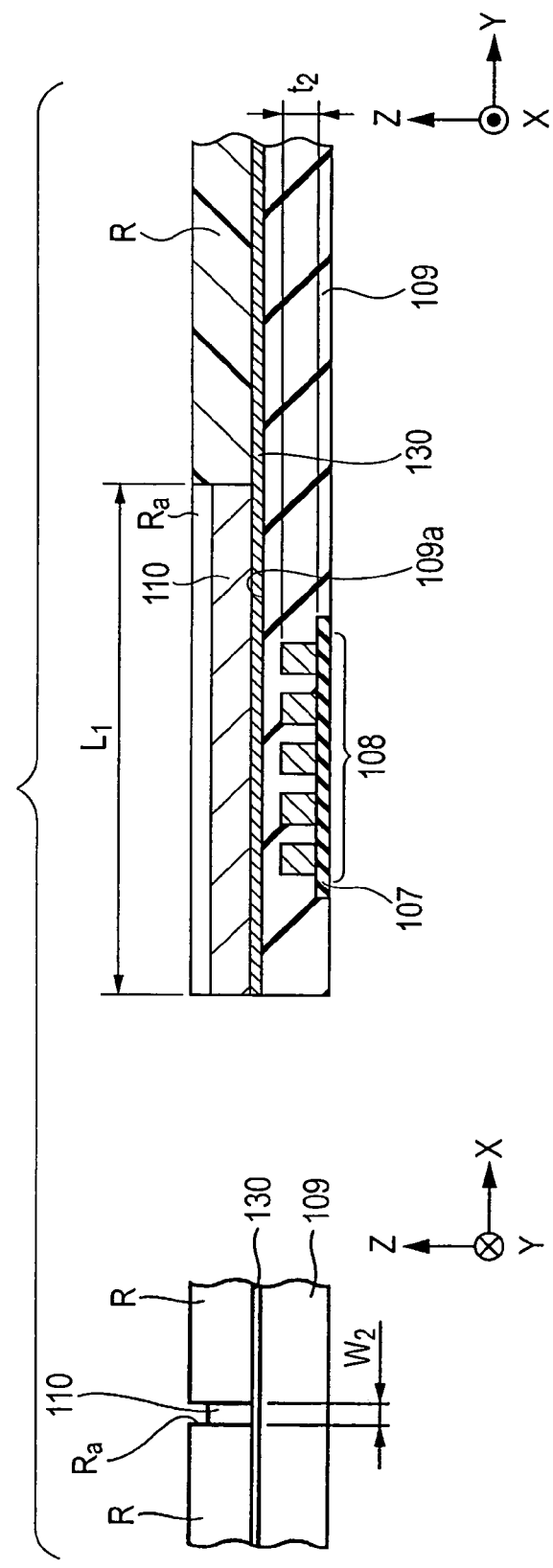

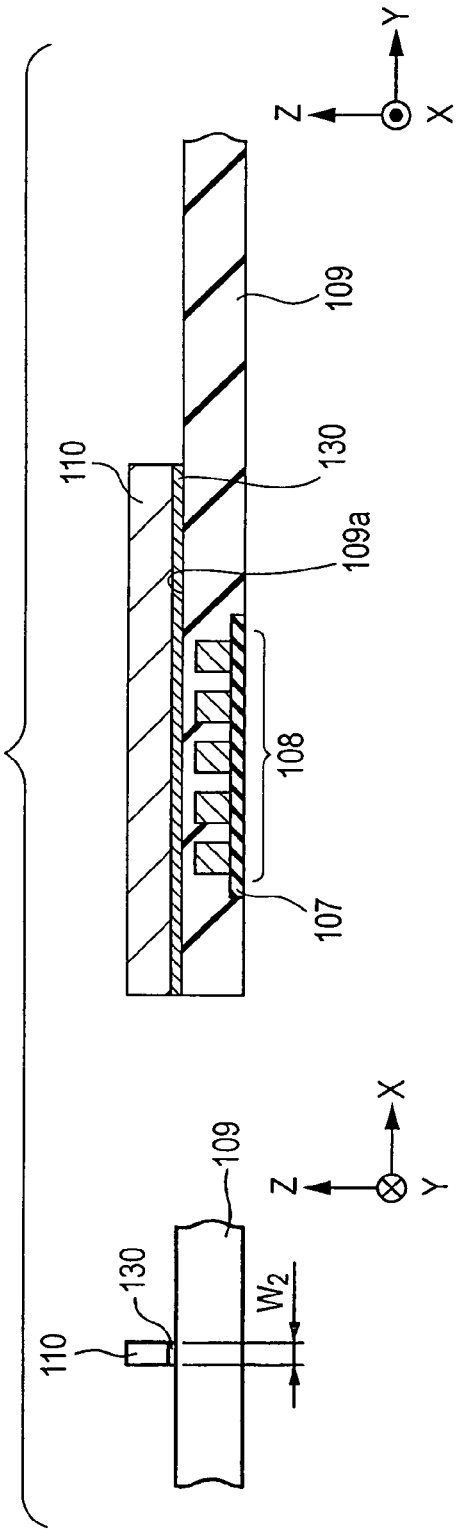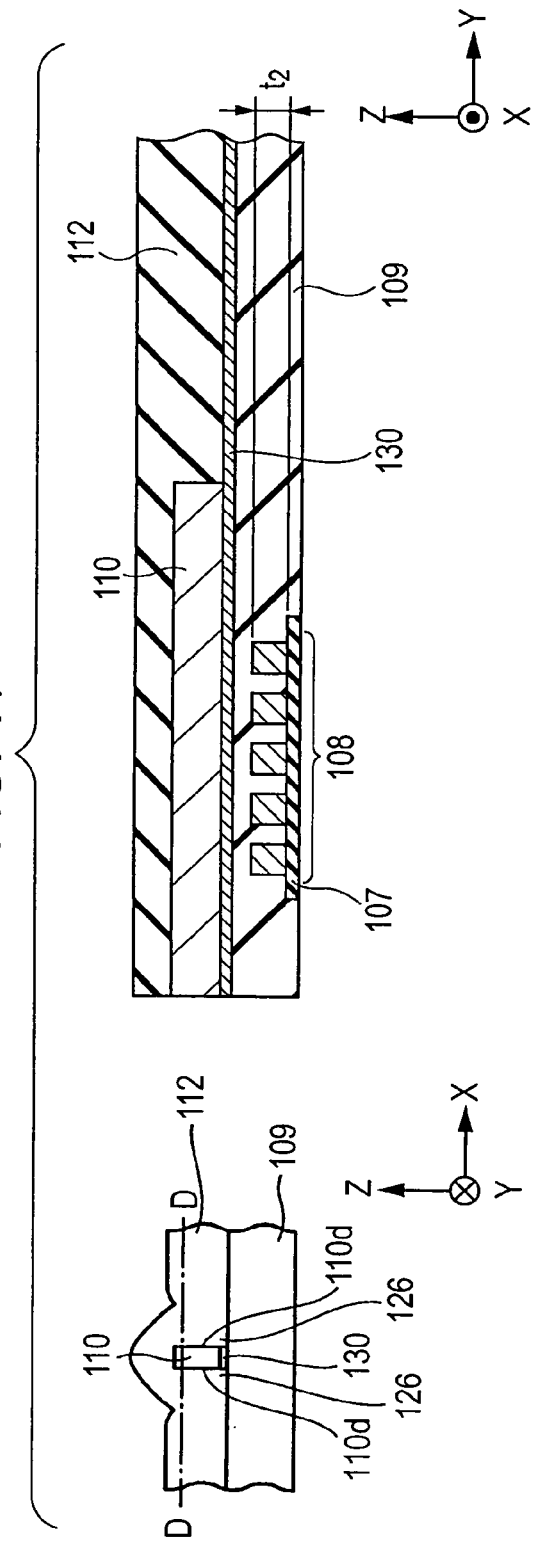

FIG. 14
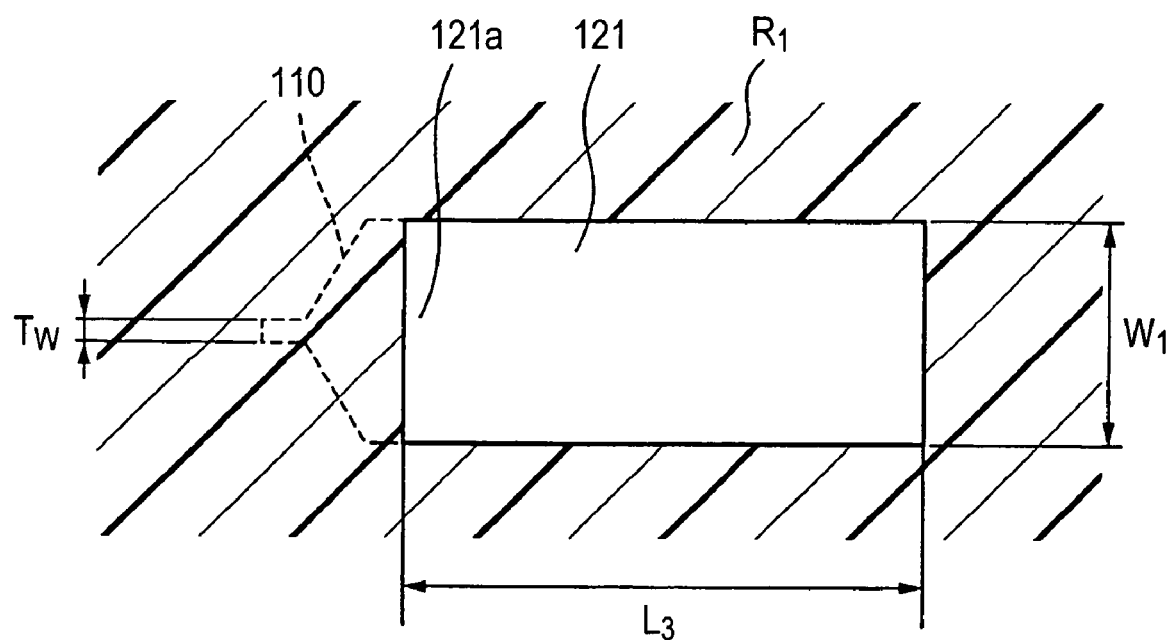
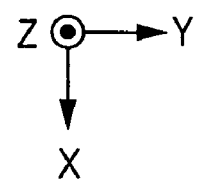

THIN FILM MAGNETIC HEAD HAVING SOLENOIDAL COIL AND METHOD OF MANUFACTURING THE SAME

BACKGROUND OF THE INVENTION

1. Field of the Invention

The present invention relates to a recording magnetic head used as a floating type magnetic head or the like, and more particularly, relates to a magnetic head capable of reducing series resistance of a coil layer.

2. Description of the Related Art

FIG. 19 is a vertical cross-sectional view showing a related magnetic head.

A magnetic head H1 shown in FIG. 19 is a so-called perpendicular magnetic recording head which applies a perpendicular magnetic field to a recording medium M so as to magnetize a hard film Ma of the recording medium M in a perpendicular direction.

The recording medium M has, for example, a disc shape, is composed of the hard film Ma having a high residual magnetization and located at a magnetic head H1 side and a soft film Mb having a high magnetic permeability and located at a side apart from the magnetic head H1, and is allowed to rotate around the center of the disc.

A slider 1 is formed of a non-magnetic material such as $Al_2O_3$.TiC, and a facing surface 1a of the slider 1 faces the recording medium M. When the recording medium M is allowed to rotate, due to an airflow generated along the surface thereof, the slider 1 floats above the surface of the recording medium M or slides on the surface thereof. In FIG. 19, the moving direction of the recording medium M with respect to the slider 1 is a direction indicated by an arrow A.

On an end surface 1b at a trailing side of the slider 1, a non-magnetic insulating layer 2 composed of an inorganic material such as $Al_2O_3$ or $SiO_2$ is formed, and on this non-magnetic insulating layer 2, a reading portion HR is formed.

The reading portion HR has a lower shield layer 3, an upper shield layer 6, an inorganic insulating layer (gap insulating layer) 5 provided therebetween, and a reading element 4 provided in the inorganic insulating layer 5. The reading element 4 is a magnetoresistive effect element such as an AMR (anisotropic magnetoresistive effect), a GMR (giant magnetoresistive effect), or a TMR (tunnel magnetoresistive effect) element.

A plurality of second coil layers 8 composed of a conductive material such as copper is formed on the upper shield layer 6 with a coil insulating underlayer 7 provided therebetween.

Around the second coil layers 8, a coil insulating layer 9 is formed which is composed of an inorganic insulating material such as $Al_2O_3$ or an organic insulating material such as a resist.

On the coil insulating layer 9, an auxiliary yoke layer 21 is formed, and on this auxiliary yoke layer 21, a main magnetic pole layer 10 is formed which has a predetermined length L2 extending from a facing surface H1a in a height direction and a predetermined width in a track width direction (X direction in the figure) at the facing surface H1a, the width being equivalent to a track width Tw. The main magnetic pole layer 10 is formed, for example, by plating using a ferromagnetic material, such as Ni—Fe, Co—Fe, or Ni—Fe—Co, having a high saturated magnetic flux density.

On the main magnetic pole layer 10 and the auxiliary yoke layer 21, a gap layer 13 is formed using an inorganic material such as alumina or $SiO_2$.

First coil layers 15 of copper or the like are formed on the gap layer 13 with a coil insulating underlayer 14 provided therebetween. The second coil layers 8 and the first coil layers 15 are electrically connected to each other at the respective end portions thereof located along the track width direction (X direction in the figure) and are wound around the main magnetic pole layer 10 and the auxiliary yoke layer 21, so that a solenoidal coil layer is formed.

Around the first coil layers 15, a coil insulating layer 16 is formed using an inorganic insulating material such as $Al_2O_3$ or an organic insulating material such as a resist, and a return path layer 17 is formed using a ferromagnetic material such as Permalloy so as to cover this coil insulating layer 16 and the gap layer 13.

At a rear side of a coupling portion 17b of the return path 17 in the height direction (Y direction in the figure), a lead layer 19 extending from the first coil layers 15 is formed on the coil insulating underlayer 14. In addition, the return path layer 17 and the lead layer 19 are covered with a protective layer 20 formed of an inorganic non-magnetic insulating material or the like.

In the magnetic head H1, when a recording current is supplied to the second coil layers 8 and the first coil layers 15 via the lead layer 19, by a current magnetic field of the current flowing through the second coil layers 8 and the first coil layers 15, a recording magnetic field is induced in the main magnetic pole layer 10 and the return path layer 17. At the facing surface H1a, a magnetic flux $\phi1$ of the recording magnetic field flows from a front surface 10c of the main magnetic pole layer 10 and then sequentially flows through the hard film Ma and the soft film Mb of the recording medium M. After a recording signal is recorded on the recording medium M, the magnetic flux $\phi1$ is returned to a front surface 17a of the return path layer 17.

A film thickness t1 of the first coil layer 15 is equal to or larger than a film thickness t2 of the second coil layer 8. A magnetic head having a coil layer of a solenoidal structure as described above has been disclosed, for example, in FIGS. 23 and 24 of US Patent Publication No. 2004/0012884 A1.

As is the case in the past, when the film thickness t1 of the first coil layer 15 is equal to the film thickness t2 of the second coil layer 8, due to heat generated from the coil, the facing surface facing the recording medium of the magnetic head is expanded and is liable to be brought into contact with the recording medium. In addition when the film thickness t1 of the first coil layer 15 is larger than the film thickness t2 of the second coil layer 8, a magnetic path length of a magnetic circuit of the magnetic head is increased, and as a result, recording efficiency is decreased. Hence, in a related magnetic head, improvement in recording properties has not been desirably performed, and in addition, the amount of heat thus generated is still large.

SUMMARY OF THE INVENTION

Accordingly, in order to solve the problems described above, the present invention provides a magnetic head and a manufacturing method thereof, the magnetic head being capable of decreasing series resistance of a coil layer so that a facing surface facing a recording medium is prevent from being brought into contact therewith, which is caused by thermal expansion of the magnetic head, and being capable of improving recording efficiency.

A magnetic head of the present invention comprises: a first magnetic layer having a width, which determines a track width, in a track width direction at a facing surface facing a recording medium, a second magnetic layer having a width, which is larger than the track width, in the track width direction at the facing surface facing the recording medium, the first magnetic layer and the second magnetic layer being disposed in an element thickness direction with a space provided therebetween and being coupled to each other at a height direction side, a plurality of first coil pieces provided in the space between the first magnetic layer and the second magnetic layer with predetermined intervals in the height direction and extending in a direction intersecting the first magnetic layer and the second magnetic layer; a plurality of second coil pieces provided outside the space between the first magnetic layer and the second magnetic layer with predetermined intervals in the height direction and extending in a direction intersecting the first magnetic layer and the second magnetic layer. In the magnetic head described above, the first coil pieces are connected to each other at end portions thereof with the second coil pieces provided therebetween to be wound around the first magnetic layer and the second magnetic layer so that a solenoidal coil is formed, and a film thickness of the second coil pieces is larger than a film thickness of the first coil pieces.

The second coil pieces may be provided below the first magnetic layer or the second magnetic layer, whichever is located below.

In the present invention, the magnetic head may further comprise an auxiliary yoke layer composed of a magnetic material at an upper side or a lower side of the first magnetic layer.

In particular, the auxiliary yoke layer described above is preferably provided in the space between the first magnetic layer and the second magnetic layer.

In addition, the auxiliary yoke layer has an inclined front surface or a curved front surface at the facing surface side, the height of the front surface being increased along the height direction.

The auxiliary yoke layer is preferably formed by sputtering.

The second magnetic layer and the first magnetic layer are preferably coupled to each other with the auxiliary yoke layer provided therebetween.

A method for manufacturing a magnetic head, according to the present invention, comprises: a step (a) of forming a plurality of second coil pieces extending in a direction intersecting a height direction with predetermined intervals in the height direction; a step (b) of forming a first magnetic layer having a width, which determines a track width, in a track width direction at a facing surface facing a recording medium; a step (c) of forming an auxiliary yoke layer using a magnetic material on the first magnetic layer by sputtering; a step (d) of forming a plurality of first coil pieces at an upper side of the first magnetic layer and the auxiliary yoke layer so that end portions of adjacent first coil pieces are connected to each other with the second coil pieces provided therebetween to form a coil winding around the first magnetic layer in a solenoidal manner, the first coil pieces extending in a direction intersecting the first magnetic layer with predetermined intervals in the height direction and having a film thickness smaller than a film thickness of the second coil pieces; and a step (e) of forming a second magnetic layer at an upper side of the first coil pieces, the second magnetic layer having a larger width in the track width direction at the facing surface than the track width, the first magnetic layer and the second magnetic layer being coupled to each other at the height direction side.

According to the present invention, in the step (c) described above, the auxiliary yoke layer is preferably formed in a magnetic field applied in the track width direction.

In the step (e) described above, the second magnetic layer and the first magnetic layer are preferably coupled to each other with the auxiliary yoke layer provided therebetween.

In the magnetic head of the present invention, the film thickness of the second coil pieces is larger than the film thickness of the first coil pieces.

By the structure described above, while a magnetic path length of magnetic flux flowing through the first magnetic layer and the second magnetic layer is decreased by decreasing the film thickness of the first coil pieces disposed between the first magnetic layer and the second magnetic layer, the series resistance of the entire coil layer can be decreased by increasing the film thickness of the second coil pieces. Hence, in the magnetic head of the present invention, a phenomenon in which the facing surface facing the recording medium protrudes due to heat generated from the coil layer can be suppressed.

In addition, according to the present invention, since the auxiliary yoke layer is formed in the space formed between the first magnetic layer and the second magnetic layer, the film thickness of the first coil pieces can be decreased.

In addition, when the front surface of the auxiliary yoke layer at the facing surface side has an inclined or a curved shape so that the height of which is being increased along the height direction, a phenomenon (side erasing phenomenon) can be suppressed in which a magnetic recording signal recorded in a recording track is erased by an adjacent recording track in which a recording is being performed. That is, since the front surface of the auxiliary yoke layer can be disposed closer to the facing surface than that disposed in the past, the recording efficiency can be improved.

When the auxiliary yoke layer is formed by sputtering, the variation in film thickness of the auxiliary yoke layer can be decreased to 3% or less.

In addition, when the first magnetic layer and the second magnetic layer are coupled to each other with the auxiliary yoke layer provided therebetween, the first magnetic layer can be prevented from being corroded in manufacturing.

Furthermore, when the auxiliary yoke layer is formed in a magnetic field applied in the track width direction, the direction of easy magnetization axis of the auxiliary yoke layer can be aligned in the track width direction. Accordingly, a recording magnetic signal recorded in a recording track on the recording medium can be prevented from being unintentionally erased when recording is not performed.

BRIEF DESCRIPTION OF THE DRAWINGS

FIG. 8 is a view for illustrating one step of a manufacturing method of the magnetic head shown in FIG. 1;

FIG. 9 is a view for illustrating one step of a manufacturing method of the magnetic head shown in FIG. 1;

FIG. 10 is a view for illustrating one step of a manufacturing method of the magnetic head shown in FIG. 1;

FIG. 11 is a view for illustrating one step of a manufacturing method of the magnetic head shown in FIG. 1;

FIG. 14 is a view for illustrating one step of a manufacturing method of the magnetic head shown in FIG. 1;

DESCRIPTION OF THE PREFERRED EMBODIMENTS

Figure 1:
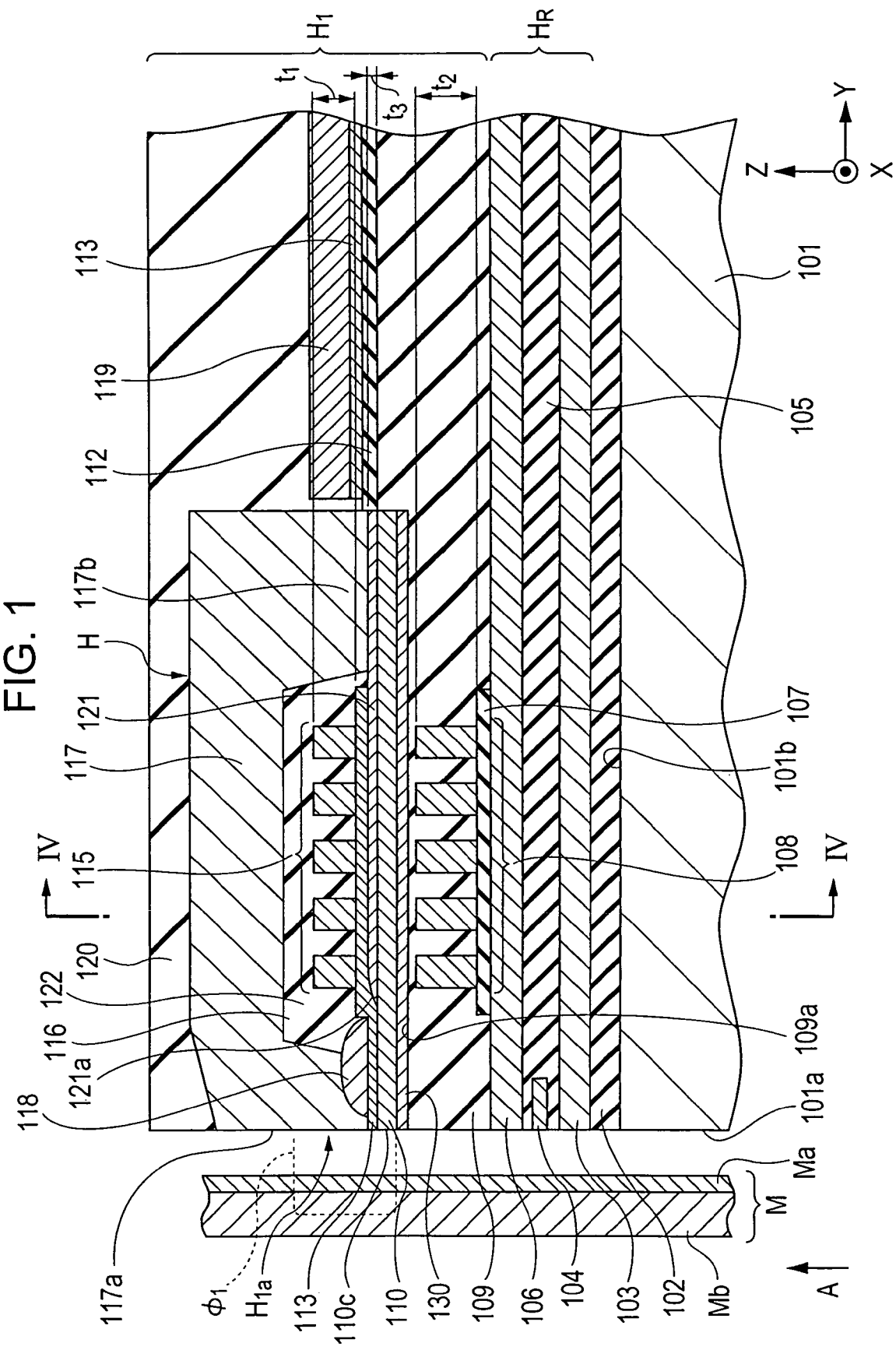
FIG. 1 is a vertical cross-sectional view of a magnetic head according to a first embodiment of the present invention.

FIG. 1 is a vertical cross-sectional view of a magnetic head according to a first embodiment of the present invention.

A magnetic head H1 shown in FIG. 1 is a so-called perpendicular magnetic recording head which applies a perpendicular magnetic field to a recording medium M so as to magnetize a hard film Ma of the recording medium M in a perpendicular direction.

The recording medium M has, for example, a disc shape, is composed of the hard film Ma having a high residual magnetization and located at a magnetic head H1 side and a soft film Mb having a high magnetic permeability and located at a side apart from the magnetic head H1, and is allowed to rotate around the center of the disc.

A slider 101 is formed of a non-magnetic material such as $Al_2O_3.TiC$, and a facing surface 101a of the slider 101 faces the recording medium M. When the recording medium M is allowed to rotate, due to an airflow generated along the surface thereof, the slider 101 floats above the surface of the recording medium M or slides on the surface thereof. In FIG. 1, the moving direction of the recording medium M with respect to the slider 101 is a direction indicated by an arrow A.

On an end surface 101b at a trailing side of the slider 101, a non-magnetic insulating layer 102 composed of an inorganic material such as $Al_2O_3$ or $SiO_2$ is formed, and on this non-magnetic insulating layer 102, a reading portion HR is formed.

The reading portion HR has a lower shield layer 103, an upper shield layer 106, an inorganic insulating layer (gap insulating layer) 105 provided therebetween, and a reading element 104 provided in the inorganic insulating layer 105. The reading element 104 is a magnetoresistive effect element such as an AMR, a GMR, or a TMR element.

On the upper shield layer 106, a plurality of second coil layers (second coil piece) 108 composed of a conductive material is formed with a coil insulating underlayer 107 provided therebetween. The second coil layers 108 are formed, for example, of at least one non-magnetic metal material selected from the group consisting of Au, Ag, Pt, Cu, Cr, Al, Ti, NiP, Mo, Pd, and Rh. Alternatively, the second coil layers 108 may have a laminate structure containing layers composed of at least one of the non-magnetic metal materials mentioned above.

Around the second coil layers 108, a coil insulating layer 109 is formed using an inorganic insulating material such as $Al_2O_3$ or an organic insulating material such as a resist.

An upper surface 109a of the coil insulating layer 109 is planarized, and a plating underlayer 130 is formed on the upper surface 109a. On this plating underlayer 130, a main magnetic pole layer 110 (first magnetic layer) is formed having a predetermined length L2 extending from a facing surface H1a in a height direction and a width in a track width direction (X direction in the figure) which is equivalent to a track width Tw at the facing surface H1a and which is increased from the facing surface H1a in the height direction. The main magnetic pole layer 110 is formed by plating using a ferromagnetic material, such as Ni—Fe, Co—Fe, or Ni—Fe—Co, having a high saturated magnetic flux density.

In addition, on the main magnetic pole layer 110, an auxiliary yoke layer 121 is formed having a width W1 in the track width direction which is large than the track width Tw. The auxiliary yoke layer 121 is formed of a magnetic alloy such as a NiFe alloy. However, the auxiliary yoke layer 121 is preferably formed using a material having superior corrosion resistance to that for the main magnetic pole layer 110. For example, the content of Fe of a material for the auxiliary yoke layer 121 is decreased as compared to that of a material for the main magnetic pole layer 110.

Figure 3:
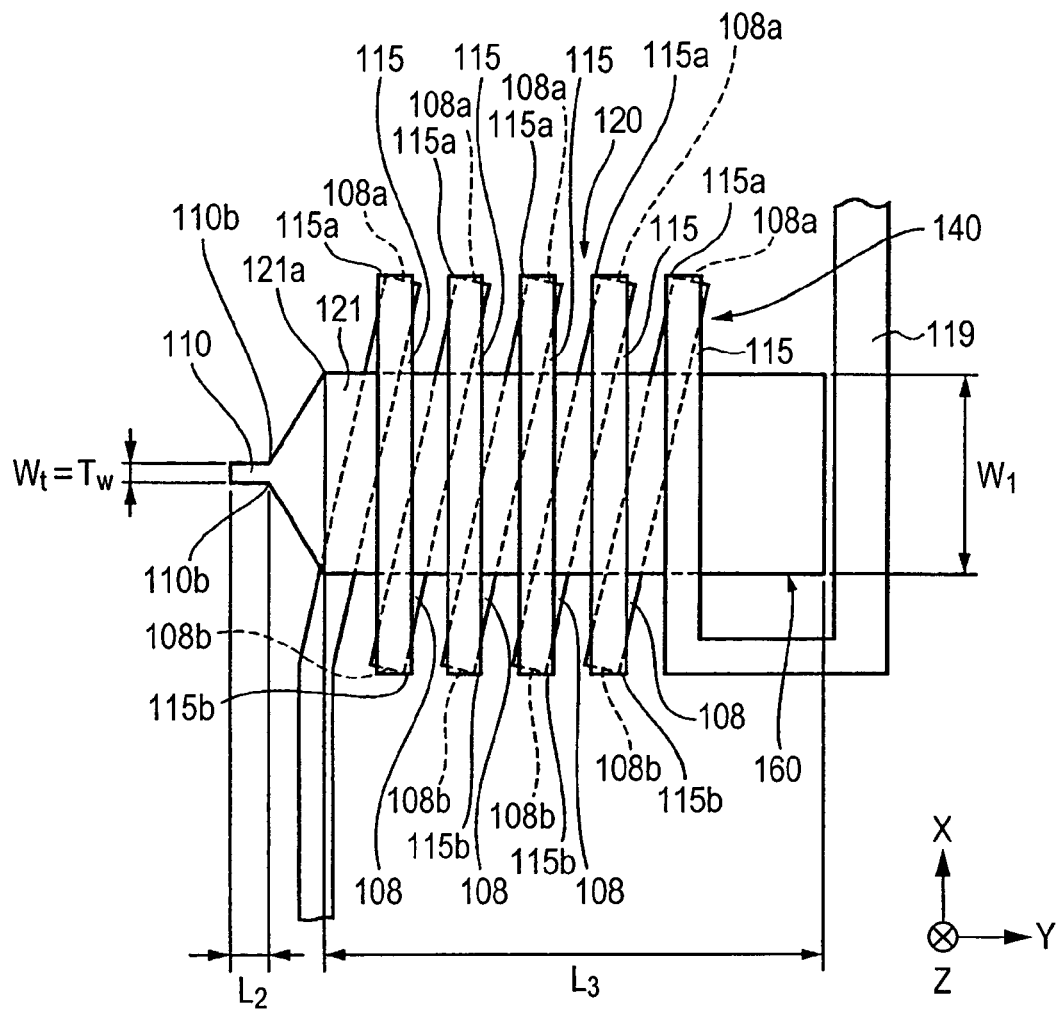
FIG. 3 is a partial plan view of the magnetic head shown in FIG. 1.

As shown in FIG. 3, in particular, the track width Tw is formed in the range of 0.03 to 0.5 µm, and the length L2 is formed in the range of 0.03 to 0.5 µm.

Figure 19:
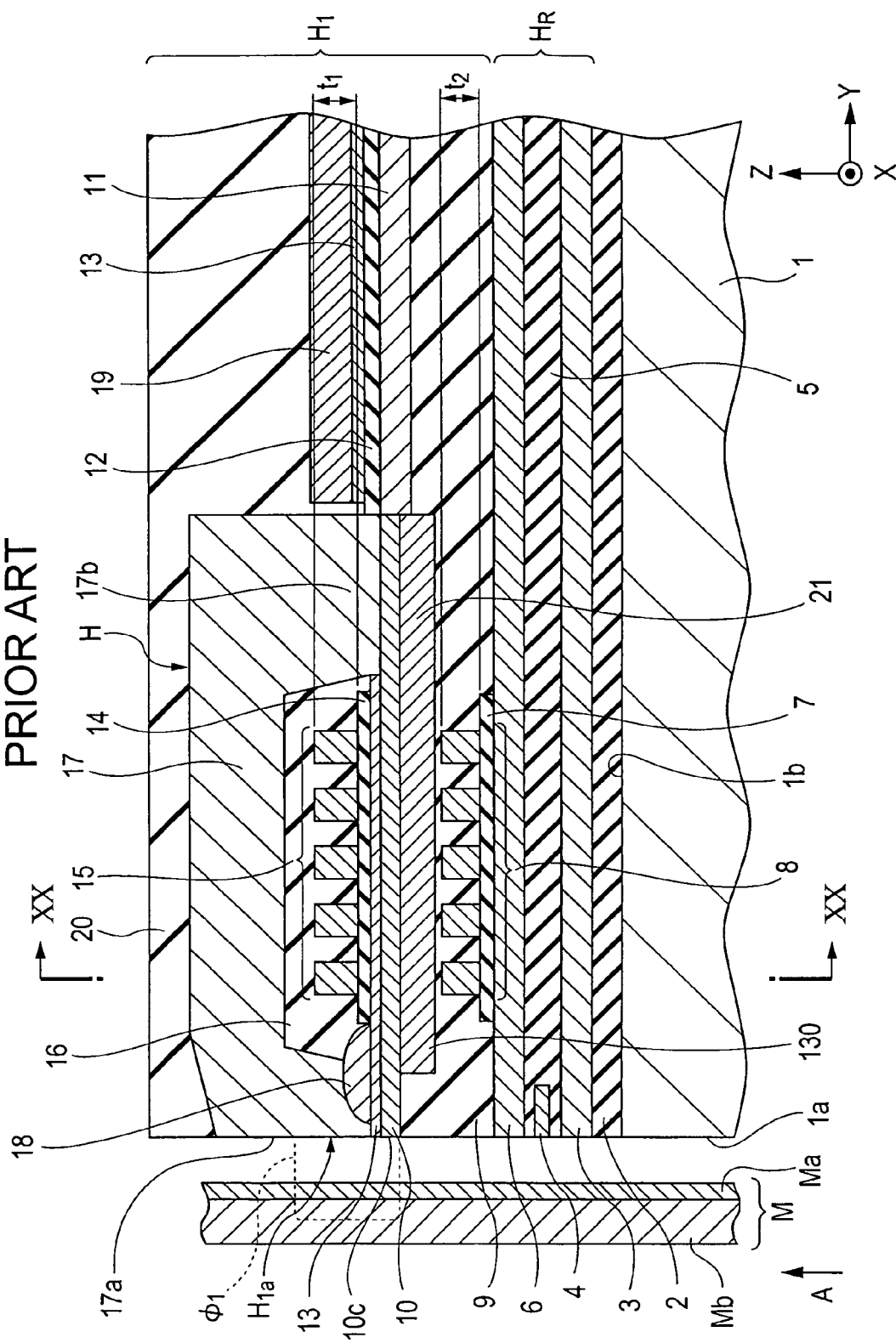
FIG. 19 is a cross-sectional view of a related magnetic head.

In addition, the width W1 of the auxiliary yoke layer 121 in the track width direction (X direction in the figure) is approximately 1 to 100 µm in the largest area, and a length L3 of the auxiliary yoke layer 121 in the height direction is approximately 1 to 100 µm. A film thickness t3 of the auxiliary yoke layer 121 formed by sputtering is in the range of 0.05 to 0.5 µm. Since the variation in film thickness is increased when the auxiliary yoke layer 121 is formed by a plating method and polishing (CMP method), the auxiliary yoke layer 121 is necessarily formed to have a large film thickness from the beginning, and as a result, the final film thickness is also large, such as 0.5 to 1.0 µm, as shown in FIG. 19.

Figure 2:
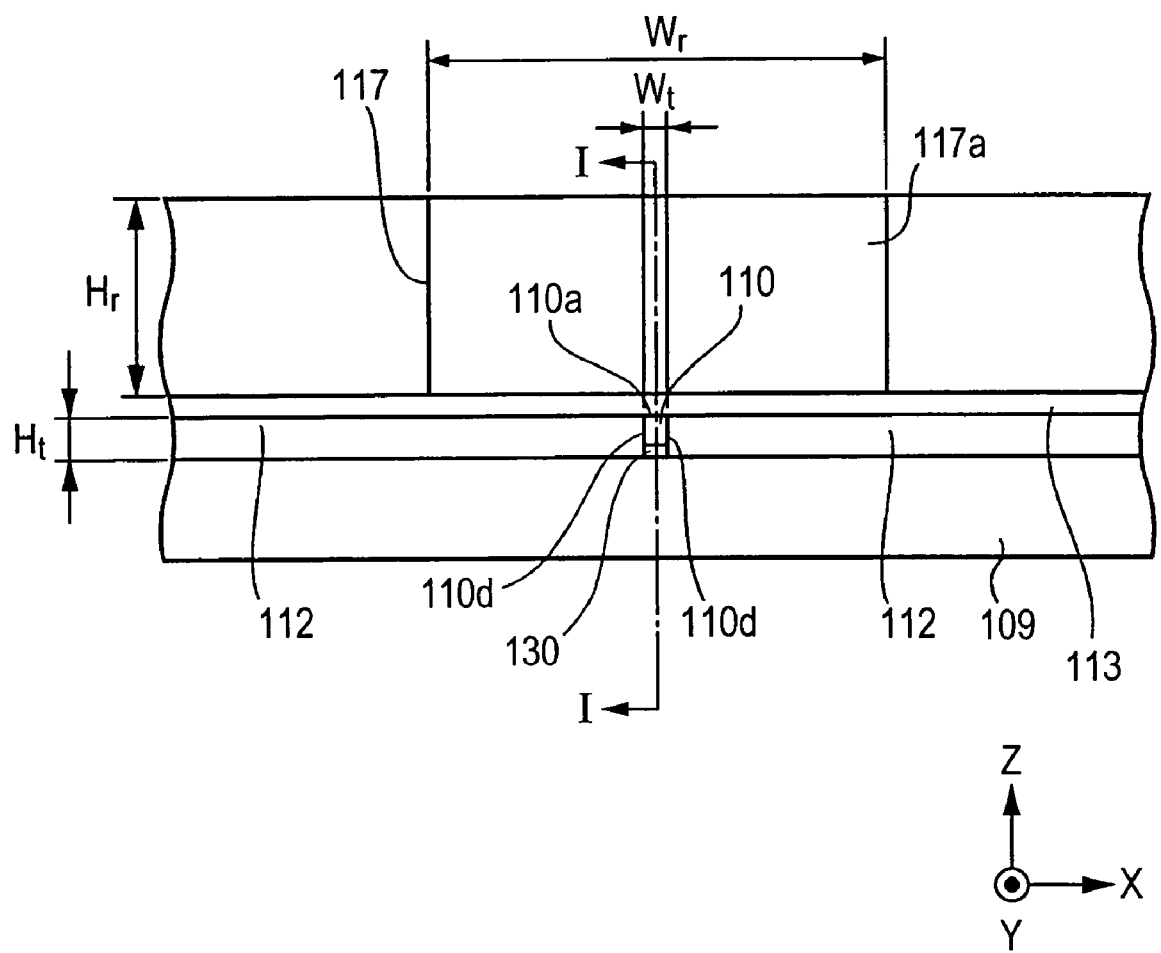
FIG. 2 is a partial front view of the magnetic head shown in FIG. 1.

FIG. 2 is a front view of the magnetic head H1 shown in FIG. 1. FIG. 1 is a cross-sectional view of the magnetic head taken along a line I-I shown in FIG. 2.

As shown in FIG. 2, the main magnetic pole layer 110 is formed to have a width Wt in the track width direction (X direction in the figure) at the facing surface H1a. Although not shown in the figure, the width of the auxiliary yoke layer 121 in the track width direction is larger than the width Wt of the main magnetic pole layer 110 in the track width direction (see FIG. 3).

On the main magnetic pole layer 110 and the auxiliary yoke layer 121, a gap layer 113 is formed using an inorganic material such as alumina or $SiO_2$.

As shown in FIG. 1, on the gap layer 113, first coil layers (first coil pieces) 115 are formed. As are the second coil layers 108, the first coil layers 115 are formed of a conductive material. The first coil layers 115 are formed of at least one non-magnetic metal material selected from the group consisting of Au, Ag, Pt, Cu, Cr, Al, Ti, NiP, Mo, Pd, and Rh. Alternatively, the first coil layer 115 may have a laminate structure containing layers composed of at least one of the non-magnetic metal materials mentioned above.

As shown in FIG. 3, three second coil layers 108 and the first coil layers 115 are electrically connected each other at the respective end portions 108a and 115a and at the respective end portions 108b and 115b located along the track width direction (X direction in the figure) and are wound around the main magnetic pole layer 110 and the auxiliary yoke layer 121, so that a solenoidal coil layer 140 is formed.

Around the first coil layers 115, a coil insulating layer 116 is formed using an inorganic insulating material such as $Al_2O_3$ or an organic insulating material such as a resist, and a return path layer 117, which is a second magnetic layer of the present invention, is formed using a ferromagnetic material such as Permalloy so as to cover this coil insulating layer 116 and the gap layer 113.

As shown in FIG. 2, a thickness Ht of a front surface 110c of the main magnetic pole layer 110 is smaller than a thickness Hr of a front surface 117a of the return path layer 117, and the width Wt of the front surface 110c of the main magnetic pole layer 110 in the track width direction (X direction in the figure) is sufficiently smaller than a width Wr of the front surface 117a of the return path layer 117. As a result, at the facing surface H1a, the area of the front surface 110c of the main magnetic pole layer 110 is sufficiently smaller than that of the front surface 117a of the return path layer 117. Hence, a magnetic flux φ of a leakage recording magnetic field is concentrated onto the front surface 110c of the main magnetic pole layer 110, and by this magnetic flux φ thus concentrated, the hard film Ma is magnetized in a direction perpendicular thereto, so that recording data is recorded.

The front surface 117a of the return path layer 117 is exposed at the facing surface H1a facing the recording medium. In addition, at a rear side apart from the facing surface H1a, a coupling portion 117b of the return path layer 117 and the main magnetic pole layer 110 are coupled to each other. Hence, a magnetic path from the main magnetic pole layer 110 to the return path layer 117 is formed.

A Gd determining layer 118 of an inorganic or an organic material is formed on the gap layer 113 at a place at a predetermined distance from the facing surface H1a facing the recording medium. By the distance from the facing surface H1a facing the recording medium to a front edge of the Gd determining layer 118, a gap depth length of the magnetic head H1 is determined.

At a rear side of the coupling portion 117b of the return path layer 117 in the height direction (Y direction in the figure), a lead layer 119 extending from the first coil layers 115 is formed. In addition, the return path layer 117 and the lead layer 119 are covered with a protective layer 120 formed of an inorganic non-magnetic insulating material or the like.

In the magnetic head H1, when a recording current is supplied to the second coil layers 108 and the first coil layers 115 via the lead layer 119, due to a current magnetic field by the current flowing through the second coil layers 108 and the first coil layers 115, a recording magnetic field is induced in the main magnetic pole layer 110 and the return path layer 117. Subsequently, at the facing surface H1a, a magnetic flux φ1 of the recording magnetic field flows from the front surface 110c of the main magnetic pole layer 110 and then sequentially flows through the hard film Ma and the soft film Mb of the recording medium M. After a recording signal is recorded on the recording medium M, the magnetic flux φ1 is returned to the front surface 117a of the return path layer 117.

A magnetic head of this embodiment will be described.

In the magnetic head of this embodiment, a film thickness t2 of the second coil layers (second coil pieces) 108 disposed under the main magnetic pole layer (first magnetic layer) 110 is larger than a film thickness t1 of the first coil layers (first coil pieces) 115.

Accordingly, while the magnetic path length of magnetic flux flowing through the main magnetic pole layer (first magnetic layer) 110 and the return path layer (second magnetic layer) 117 is decreased by decreasing the film thickness t1 of the first coil layers (first coil pieces) 115 disposed in a space 122 between the main magnetic pole layer (first magnetic layer) 110 and the return path layer (second magnetic layer) 117, by increasing the film thickness t2 of the second coil layers (second coil pieces) 108, the series resistance of the entire coil layer can be decreased. Hence, in the magnetic head of the present invention, a phenomenon can be suppressed in which the facing surface facing the recording medium protrudes due to heat generated from the coil layers.

In addition, when the auxiliary yoke layer 121 is formed in the space 122 located between the main magnetic pole layer (first magnetic layer) 110 and the return path layer (second magnetic layer) 117, the film thickness t1 of the first coil layers (first coil pieces) can be decreased.

In addition, as shown in FIG. 1, when a front surface 121a of the auxiliary yoke layer 121 at the facing surface H1a side has an inclined surface in which the height of the front surface 121a is gradually increased along the height direction (Y direction in the figure, direction opposite to the facing surface H1a), a phenomenon (side erasing phenomenon) can be suppressed in which a magnetic recording signal recorded in a recording track on the recording medium is erased by an adjacent recording track in which a recording is being performed. In addition, the film thickness t3 of the auxiliary yoke layer 121 of this embodiment is small, such as 0.05 to 0.5 μm. Hence, the front surface 121a of the auxiliary yoke layer 121 can be disposed closer to the facing surface H1a than that disposed in the past, and as a result, the recording efficiency can be improved.

When a plurality of magnetic heads is formed simultaneously on one wafer, and when auxiliary yoke layers formed by plating are polished using a CMP method, the film thicknesses of the auxiliary yoke layers of the magnetic heads on the wafer vary by approximately 10% to 20%. On the other hand, when the auxiliary yoke layers 121 are formed by sputtering, the variation in film thickness t3 of the auxiliary yoke layers 121 of the magnetic heads on the wafer can be decreased to 3% or less.

In addition, since the main magnetic pole layer (first magnetic layer) 110 and the return path layer (second magnetic layer) 117 are coupled to each other via the auxiliary yoke layer 121, the main magnetic pole layer (first magnetic layer) 110 can be prevented from being corroded in manufacturing.

Furthermore, when the auxiliary yoke layer 121 is formed in a magnetic field applied in the track width direction, the direction of easy magnetization axis of the auxiliary yoke layer 121 can be aligned in the track width direction. Consequently, a magnetic recording signal recorded in a recording track on the recording medium can be prevented from being unintentionally erased when recording is not performed.

Figure 4:
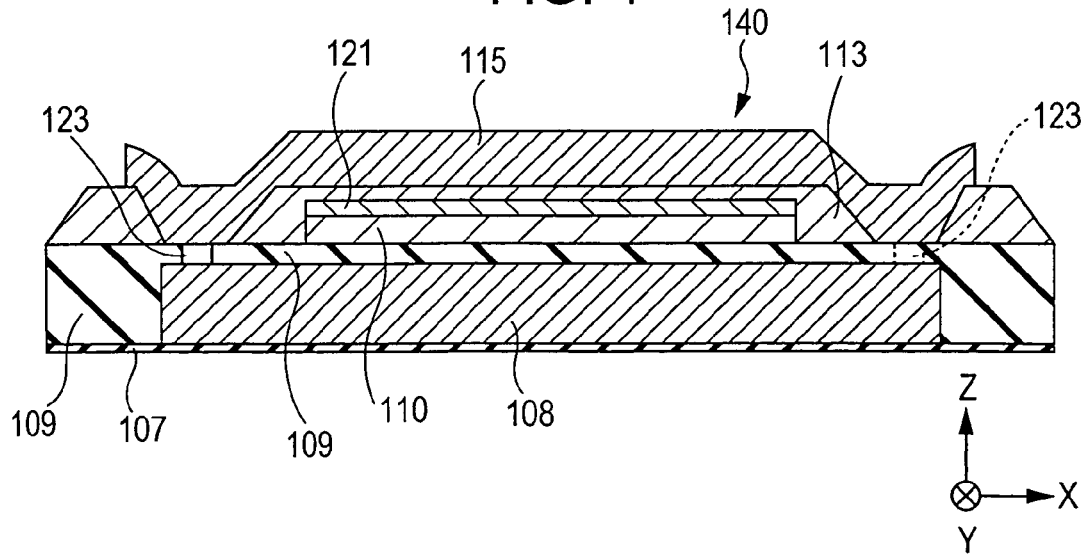
FIG. 4 is a cross-sectional view of the magnetic head taken along a line IV-IV and viewed along arrows in FIG. 1.

FIG. 4 is a cross-sectional view of the magnetic head shown in FIGS. 1 to 3 taken along a line IV-IV and viewed along arrows shown in FIG. 1.

Figure 20:
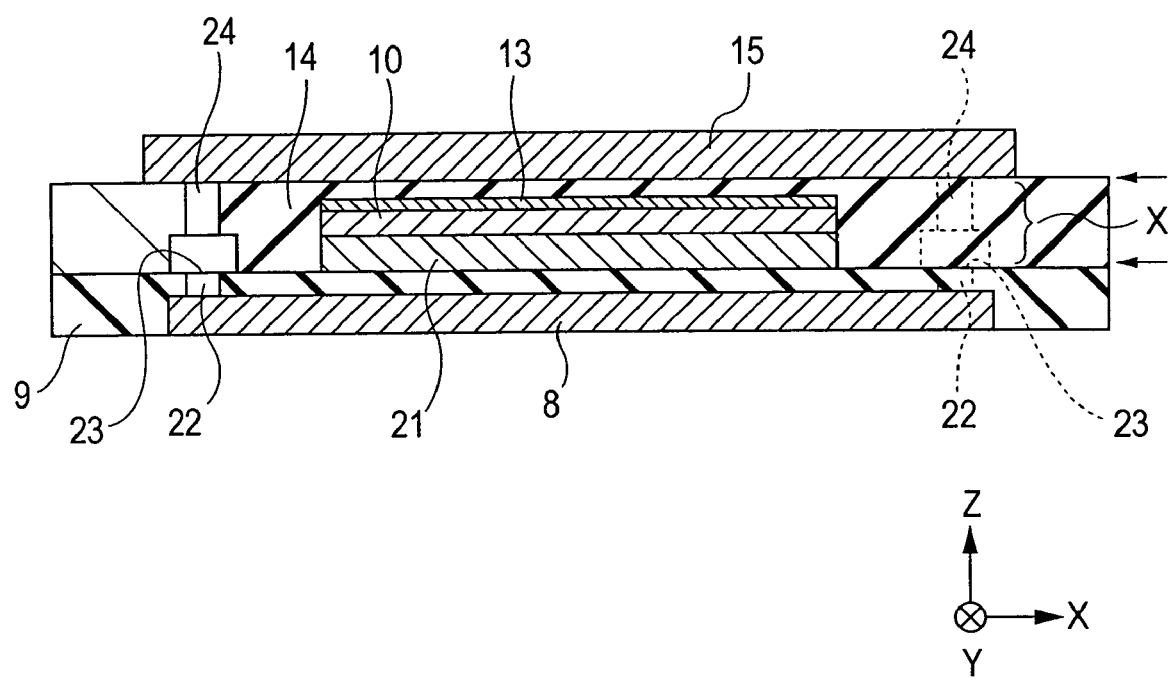
FIG. 20 is a cross-sectional view of the related magnetic head taken along a line XX-XX and viewed along arrows in FIG. 19.

In a related magnetic head shown in FIG. 20, a connection portion between the first coil layer 15 and the second coil layer 8 is composed of a first connection layer 22, a second connection layer 23, and a third connection portion 24. In particular, the second connection portion 23 is formed of the same magnetic material as that for the auxiliary yoke layer 21.

On the other hand, according to the structure shown in FIG. 4, a connection portion between the first coil layer 115 and the second coil layer 108 is formed of a connection layer 123, and this connection layer 123 can be formed using a highly conductive material such as copper. In addition, a layer formed of the same material as that for the auxiliary yoke layer 121 is not present. Furthermore, without forming the connection layer 123, the first coil layers 115 and the second coil layers 108 can be directly connected to each other. Hence, the series resistance of the entire coil layer 140 is considerably low. Although a related coil has a series resistance of approximately 1.9Ω, the coil layer 140 of this embodiment could achieve a series resistance of approximately 1.4Ω.

Figure 5:
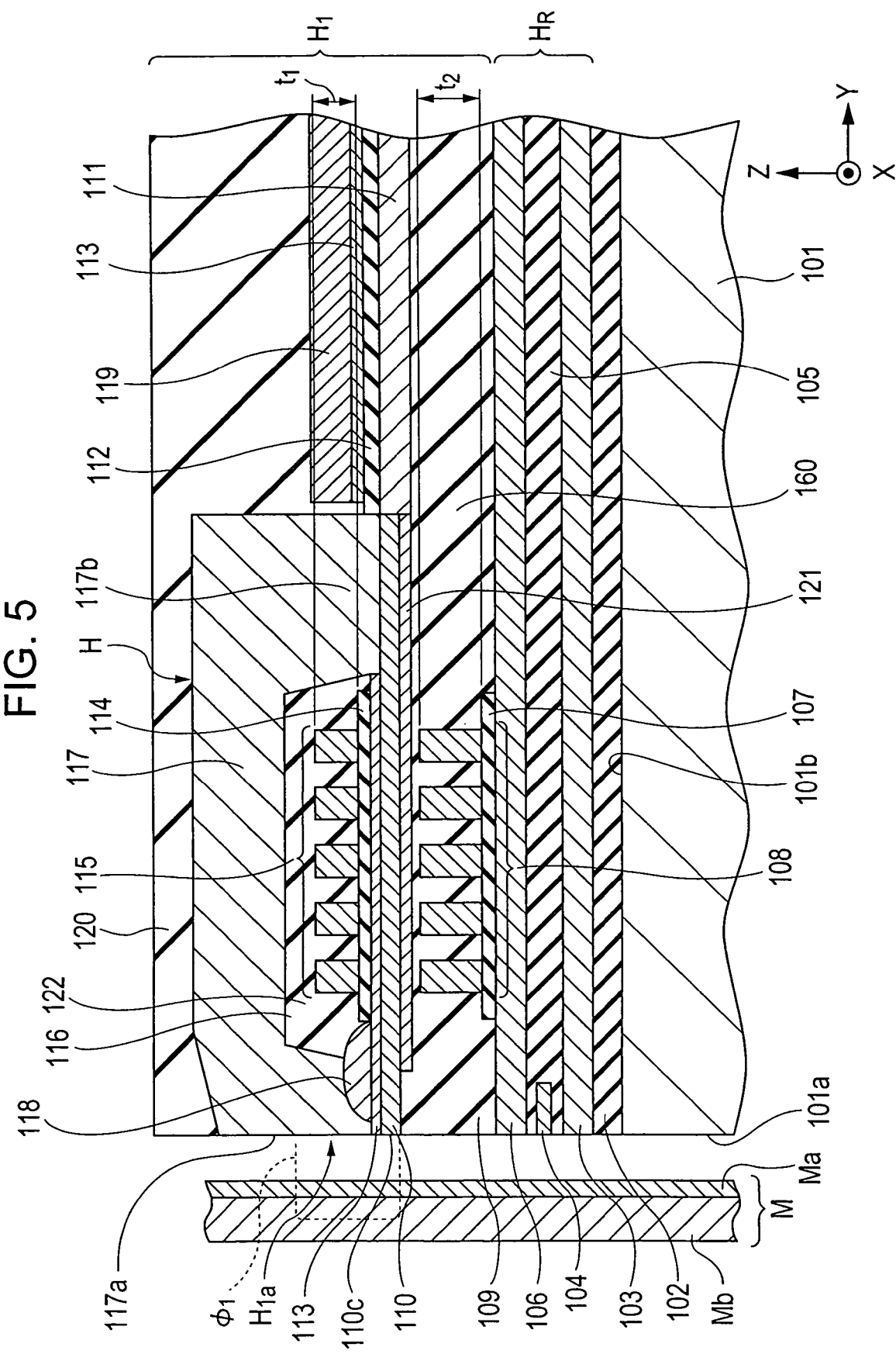
FIG. 5 is a vertical cross-sectional view of a magnetic head according to a second embodiment of the present invention.

FIG. 5 is a vertical cross-sectional view of a magnetic head according to a second embodiment of the present invention.

The magnetic head of this embodiment is equivalent to the magnetic head shown in FIGS. 1 to 3 except that the auxiliary yoke layer 121 formed by sputtering is in contact with the bottom surface of the main magnetic pole layer 110.

Also in the magnetic head of this embodiment, the film thickness t2 of the second coil layers (second coil pieces) 108 disposed under the main magnetic pole layer (first magnetic layer) 110 is larger than the film thickness t1 of the first coil layers (first coil pieces) 115.

Accordingly, while the magnetic path length of magnetic flux flowing through the main magnetic pole layer (first magnetic layer) 110 and the return path layer (second magnetic layer) 117 is decreased by decreasing the film thickness t1 of the first coil layers (first coil pieces) 115 disposed in the space 122 between the main magnetic pole layer (first magnetic layer) 110 and the return path layer (second magnetic layer) 117, the series resistance of the entire coil layer can be decreased by increasing the film thickness t2 of the second coil layers (second coil pieces) 108. Hence, in the magnetic head of the present invention, a phenomenon in which the facing surface facing the recording medium protrudes due to heat generated from the coil layer can be suppressed.

Figure 6:
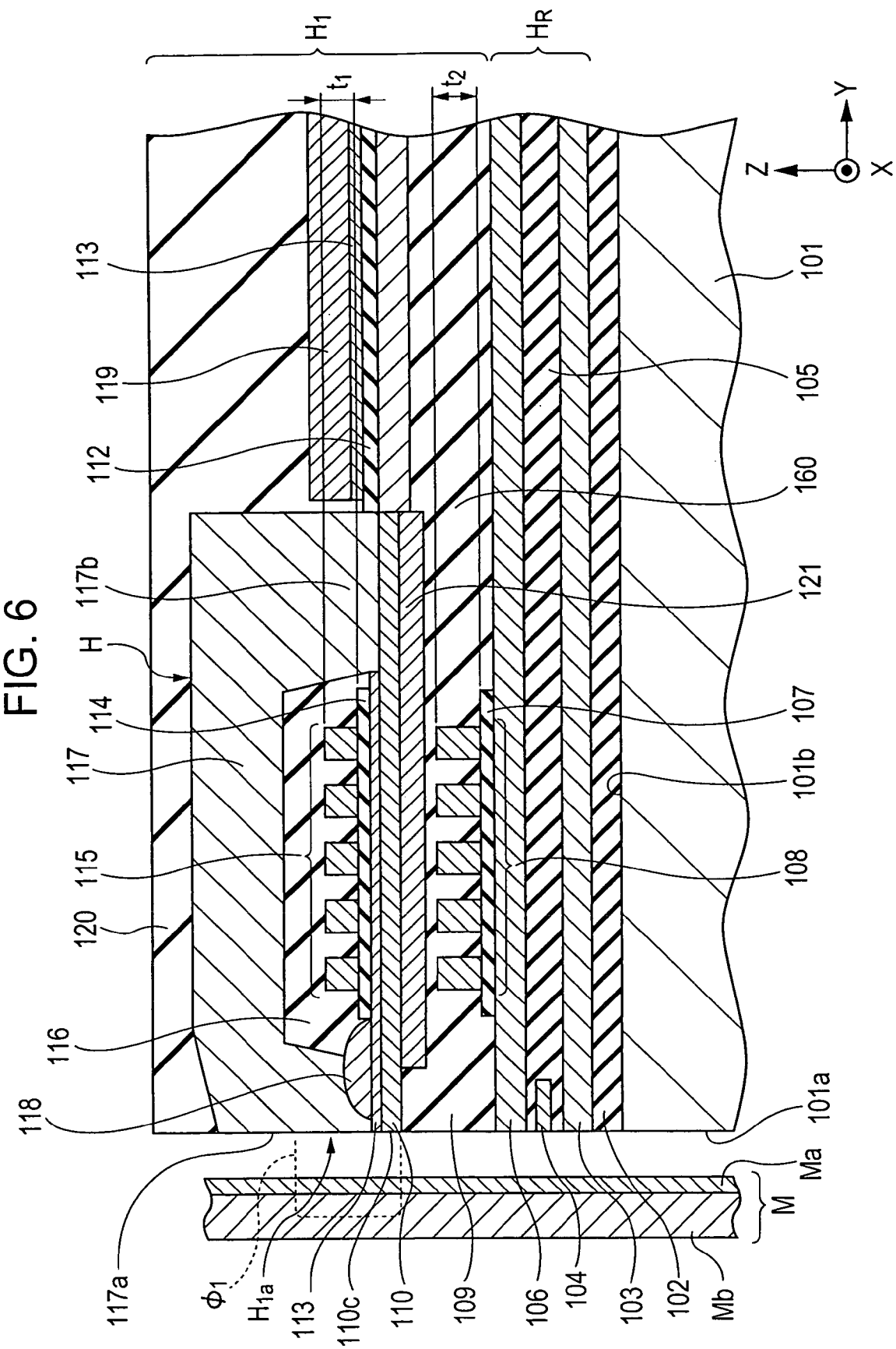
FIG. 6 is a vertical cross-sectional view of a magnetic head according to a third embodiment of the present invention.

FIG. 6 is a vertical cross-sectional view of a magnetic head according to a third embodiment of the present invention.

The magnetic head of this embodiment is equivalent to the magnetic head shown in FIGS. 1 to 3 except that the auxiliary yoke layer 121 formed by plating is in contact with the bottom surface of the main magnetic pole layer 110.

Also in the magnetic head of this embodiment, the film thickness t2 of the second coil layers (second coil pieces) 108 disposed under the main magnetic pole layer (first magnetic layer) 110 is larger than the film thickness t1 of the first coil layers (first coil pieces) 115.

Accordingly, while the magnetic path length of magnetic flux flowing through the main magnetic pole layer (first magnetic layer) 110 and the return path layer (second magnetic layer) 117 is decreased by decreasing the film thickness t1 of the first coil layers (first coil piece) 115 disposed in the space 122 between the main magnetic pole layer (first magnetic layer) 110 and the return path layer (second magnetic layer) 117, the series resistance of the entire coil layer can be decreased by increasing the film thickness t2 of the second coil layers (second coil pieces) 108. Hence, in the magnetic head of the present invention, a phenomenon in which the facing surface facing the recording medium protrudes due to heat generated from the coil layer can be suppressed.

Figure 7:
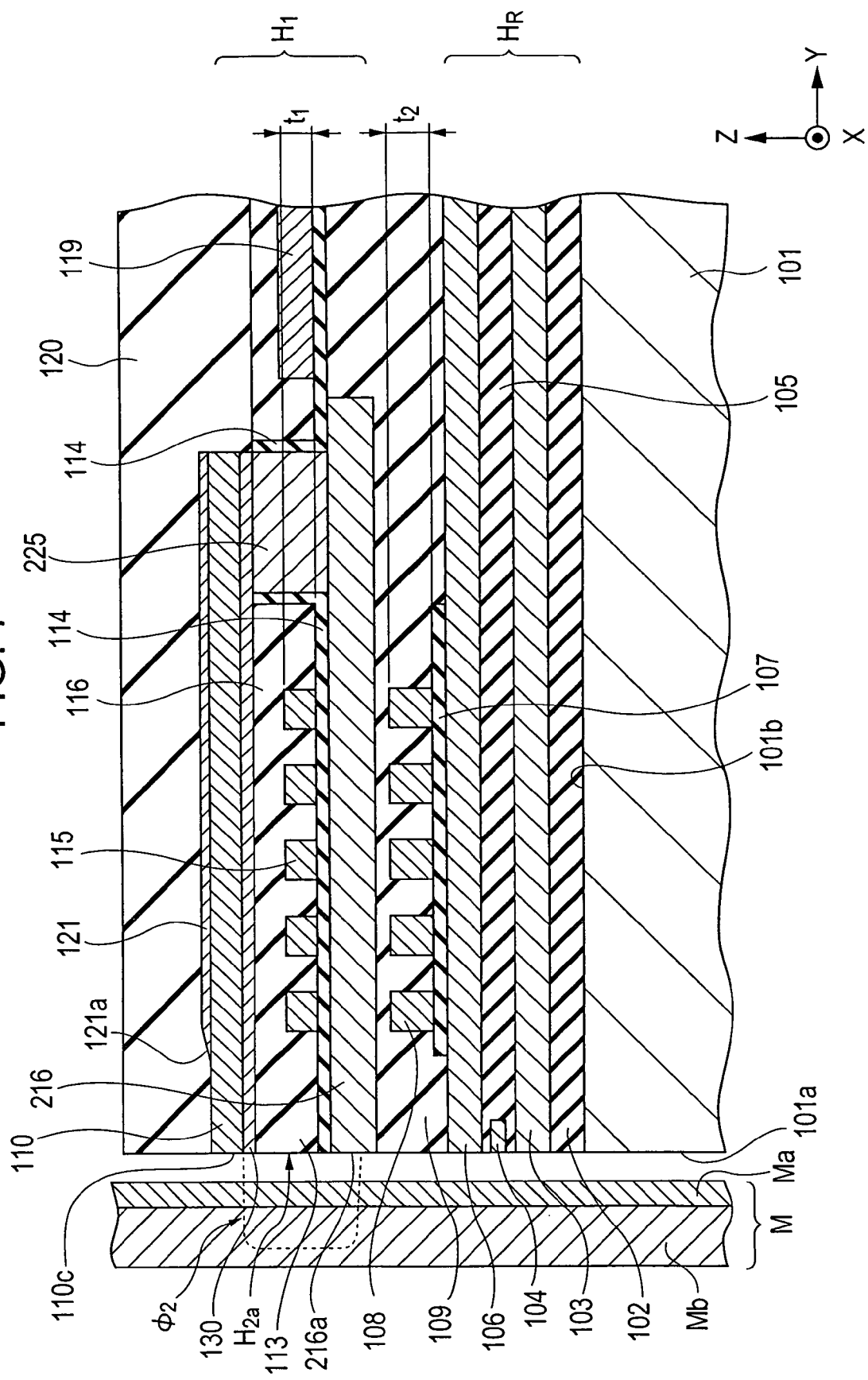
FIG. 7 is a vertical cross-sectional view of a magnetic head according to a fourth embodiment of the present invention.
Figure 12:
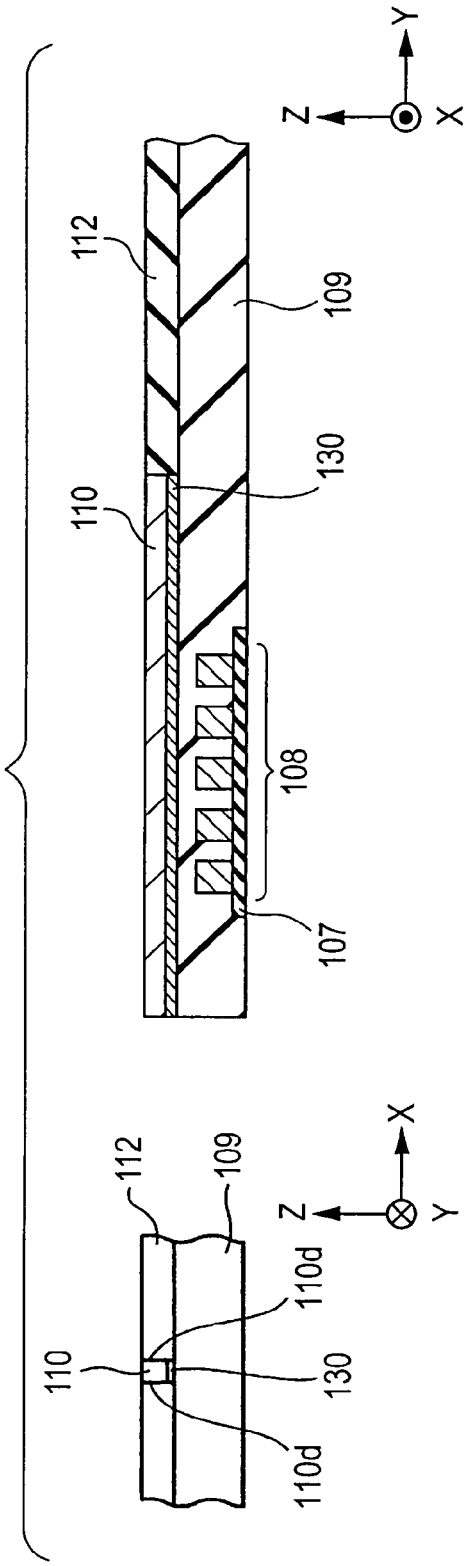
FIG. 12 is a view for illustrating one step of a manufacturing method of the magnetic head shown in FIG. 1.

FIG. 7 is a vertical cross-sectional view of a magnetic head according to a fourth embodiment of the present invention.

The magnetic head of this embodiment is equivalent to the magnetic head shown in FIGS. 1 to 3 except that a return path layer (second magnetic layer) 216 composed of a magnetic material is disposed below the main magnetic pole layer (first magnetic layer) 110. The return path layer 216 and the main magnetic pole layer 110 are coupled to each other via a coupling layer 225 formed of a magnetic material. In addition, the auxiliary yoke layer 121 formed by sputtering is in contact with the upper surface of the main magnetic pole layer 110.

In the magnetic head of this embodiment, the film thickness t2 of the second coil layers (second coil pieces) 108 disposed below the return path layer (second magnetic layer) 216 is larger than the film thickness t1 of the first coil layers (first coil piece) 115.

Accordingly, while the magnetic path length of magnetic flux flowing through the main magnetic pole layer (first magnetic layer) 110 and the return path layer (second magnetic layer) 216 is decreased by decreasing the film thickness t1 of the first coil layers (first coil pieces) 115 disposed in a space between the main magnetic pole layer (first magnetic layer) 110 and the return path layer (second magnetic layer) 216, the series resistance of the entire coil layer can be decreased by increasing the film thickness t2 of the second coil layers (second coil pieces) 108. Hence, in the magnetic head of the present invention, a phenomenon in which the facing surface facing the recording medium protrudes due to heat generated from the coil layer can be suppressed.

A method for manufacturing the magnetic head H1 shown in FIGS. 1 to 3 will be described.

In FIGS. 8 to 15, steps of manufacturing the magnetic head H1 are shown. In each of the figures, a partial front view of the magnetic head H1, which is viewed from the facing surface H1a side, is shown on the left side of the figure, and a vertical cross-sectional view of the magnetic head H1 is shown on the right side of the figure.

In the step shown in FIG. 8, on the reading portion HR, a plurality of the second coil layers 108 is formed using a conductive material with the coil insulating underlayer 107 provided therebetween, and around the second coil layers 108, the coil insulating layer 109 is formed using an inorganic insulating material such as $Al_2O_3$ or an organic insulating material such as a resist. Subsequently, the upper surface 109a of this coil insulating layer 109 is polished by a known method such as CMP, so that the upper surface 109a is planarized.

Next, on the planarized upper surface 109a of the coil insulating layer 109, the plating underlayer 130 is formed by sputtering. The plating underlayer 130 is formed by using a magnetic material such as NiFe, and in addition to that, a non-magnetic material may also be used.

As shown in FIG. 9, on the plating underlayer 130, a resist layer R is formed, and the resist layer R is patterned by exposure and development, a groove Ra is formed. This groove Ra is formed so as to have a predetermined interior width W2 in the track width direction (X direction in the figure) and a predetermined depth L1 extending from the facing surface H1a in the depth direction (height direction, Y direction in the figure).

As shown in FIG. 9, since the upper surface 109a of the coil insulating layer 109 is planarized by a CMP method or the like, the resist layer R can be formed to have a uniform film thickness. Hence, when the groove Ra is formed by exposure and development, the interior width of the groove Ra can be precisely formed, that is, variation in dimension thereof can be decreased as small as possible.

In the groove Ra, the main magnetic pole layer 110 is formed by plating using the plating underlayer 130 as an electrode. Subsequently, the resist layer R is removed.

In the step of forming the main magnetic pole layer 110 shown in FIG. 9, the film thickness of the main magnetic pole layer 110 must be formed larger than a film thickness to be obtained when the manufacturing is completed. After the resist layer R is removed, the plating underlayer 130 exposed around the main magnetic pole layer 110 is removed by ion milling or the like, so that the state shown in FIG. 10 is obtained. In addition, the main magnetic pole layer 110 may be polished in the track width direction by ion milling so as to decrease the width thereof in the track width direction.

Next, as shown in FIG. 11, an insulating material layer 112 is formed so as to cover the upper, sides, and rear of the main magnetic pole layer 110. Subsequently, polishing is performed along a line D-D shown in the figure by CMP or the like so as to form a planarized surface, thereby forming the state shown in FIG. 12.

Figure 13:
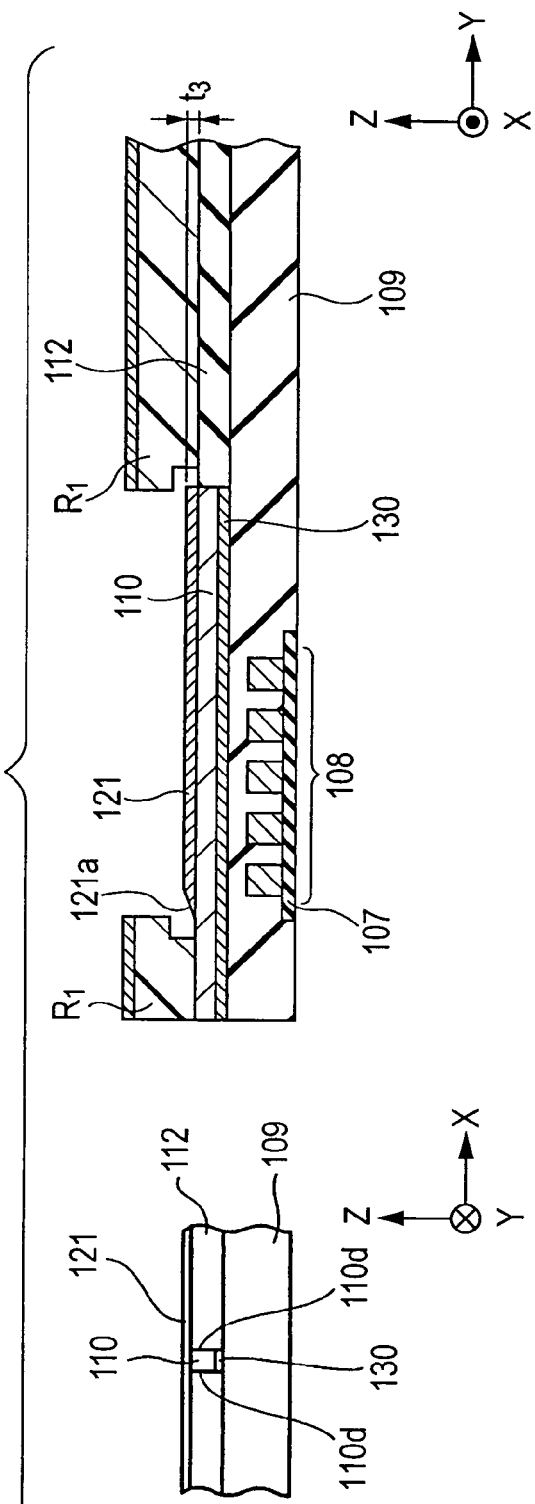
FIG. 13 is a view for illustrating one step of a manufacturing method of the magnetic head shown in FIG. 1.

Next, in the step shown in FIG. 13, on the main magnetic pole layer 110 and the insulating material layer 112, a lift-off resist R1 is formed, and a planar shape of the auxiliary yoke layer 121 is patterned. A planar shape of the patterned resist R1 is shown in FIG. 14. Subsequently, the auxiliary yoke layer 121 is formed by sputtering. The width W1 of the auxiliary yoke layer 121 in the track width direction is larger than the track width Tw. The auxiliary yoke layer 121 is formed of a magnetic alloy such as a NiFe alloy. However, the auxiliary yoke layer 121 is preferably formed using a material which is unlikely to be corroded as compared to a material for the main magnetic pole layer 110. For example, the content of Fe of a material for the auxiliary yoke layer 121 is decreased as compared to a material for the main magnetic pole layer 110.

As shown in FIG. 14, the width W1 of the auxiliary yoke layer 121 in the track width direction (X direction in the figure) is approximately 1 to 100 µm in the largest area, and the length L3 of the auxiliary yoke layer 121 in the height direction is approximately 1 to 100 µm. The film thickness t3 of the auxiliary yoke layer 121 formed by sputtering is in the range of 0.05 to 0.5 µm. Since the variation in film thickness is increased when the auxiliary yoke layer 121 is formed by a plating method and polishing (CMP method), the auxiliary yoke layer 121 is necessarily formed to have a large film thickness from the beginning, and as a result, the final film thickness is also large, such as 0.5 to 1.0 µm.

As shown in FIG. 13, when the auxiliary yoke layer is formed by sputtering, the front surface 121a of the auxiliary yoke layer 121 at the facing surface H1a side has an inclined surface in which the height thereof is gradually increased along the height direction (Y direction in the figure). When the front surface 121a has an inclined or a curved shape, a phenomenon (side erasing phenomenon) can be suppressed in which a magnetic recording signal recorded in a recording track on the recording medium is erased by an adjacent recording track in which recording is being performed. In addition, the film thickness t3 of the auxiliary yoke layer 121 of this embodiment is small, such as 0.05 to 0.5 µm. Hence, the front surface 121a of the auxiliary yoke layer 121 can be disposed closer to the facing surface H1a than that disposed in the past, and as a result, the recording efficiency can be improved.

When a plurality of magnetic heads is formed simultaneously on one wafer, and when auxiliary yoke layers formed by plating are then polished using a CMP method, the film thicknesses of the auxiliary yoke layers of the magnetic heads on the wafer vary by approximately 10% to 20%. On the other hand, when the auxiliary yoke layers 121 are formed by sputtering, the variation in film thickness t3 of the auxiliary yoke layers 121 of the magnetic heads on the wafer can be decreased to 3% or less.

Furthermore, when the auxiliary yoke layer 121 is formed in a magnetic field applied in the track width direction, the direction of easy magnetization axis of the auxiliary yoke layer 121 can be aligned in the track width direction. Consequently, a magnetic recording signal recorded in a recording track on the recording medium can be prevented from being unintentionally erased when recording is not performed.

In addition, since the auxiliary yoke layer 121 which is unlikely to be corroded as compared to the main magnetic pole layer 110 is formed thereon, the main magnetic pole layer (first magnetic layer) 110 can be prevented from being corroded in manufacturing.

Figure 15:
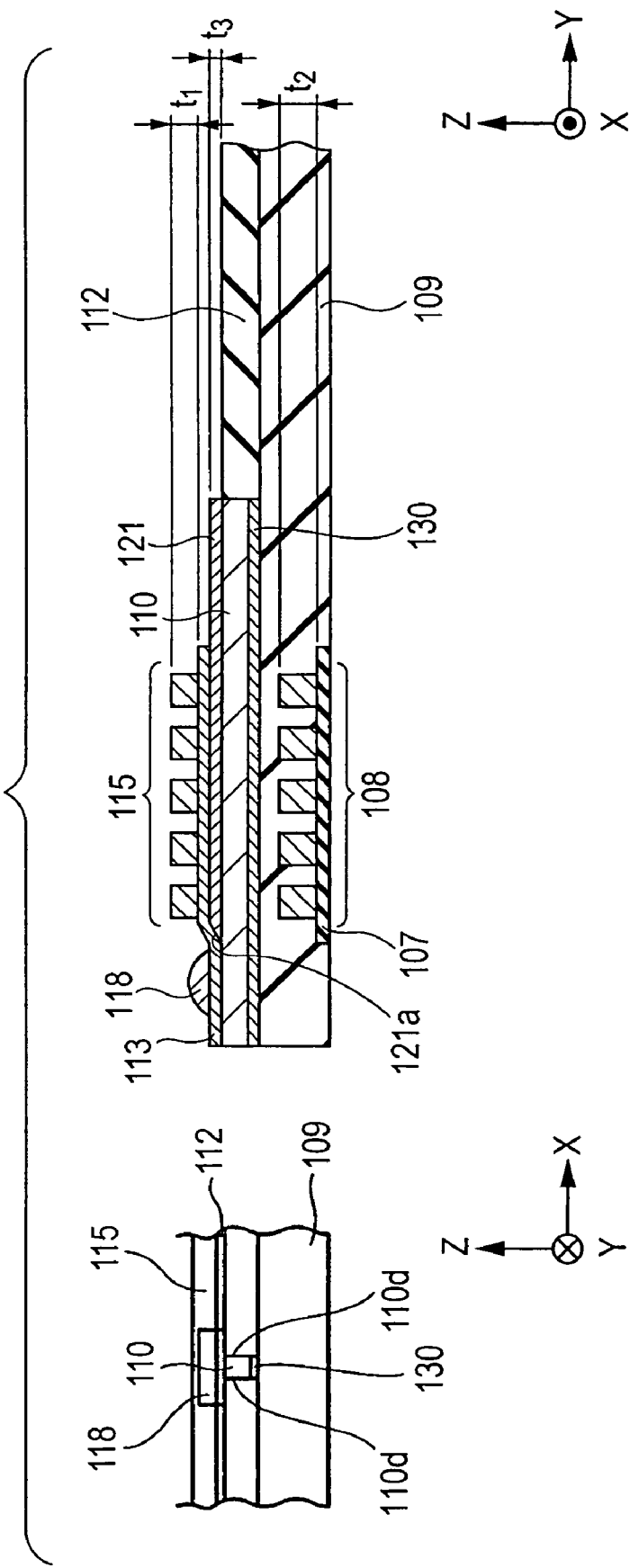
FIG. 15 is a view for illustrating one step of a manufacturing method of the magnetic head shown in FIG. 1.

After the auxiliary yoke layer 121 is formed, the gap layer 113, the Gd determining layer 118, and the first coil layers 115 are formed so as to obtain the state shown in FIG. 15. In this case, the film thickness t1 of the first coil layers 115 is set smaller than the film thickness t2 of the second coil layers 108. Furthermore, when the lead layer 119, the coil insulating layer 116, the return path layer 117, and the protective layer 120 are formed by known methods, the magnetic head shown in FIGS. 1 to 3 can be obtained. Materials for the gap layer 113, the Gd determining layer 118, the first coil layers 115, the lead layer 119, the coil insulating layer 116, the return path layer 117 and the protective layer 120 were described using FIGS. 1 to 3, and hence descriptions thereof will be omitted.

In this embodiment, the coupling portion 117b of the return path layer (second magnetic layer) 117 is formed on the auxiliary yoke layer 121.

Heretofore, the present invention has been described with reference to the preferable embodiments; however, various modifications may be made without departing the spirit and the scope of the present invention.

Figure 16:
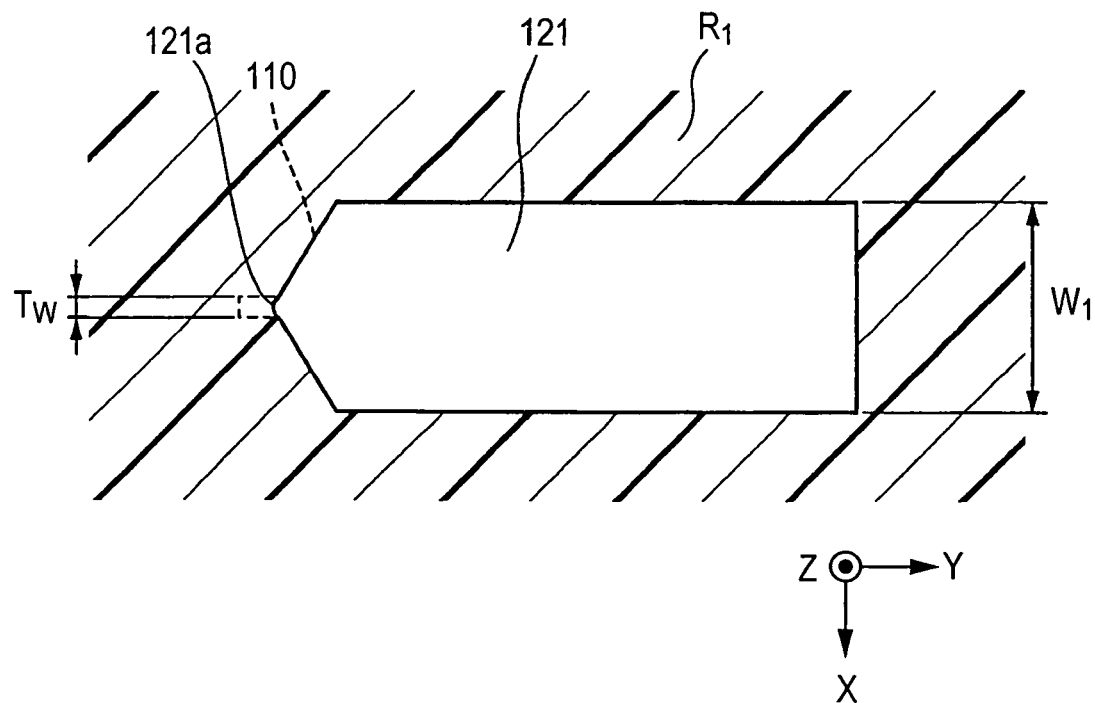
FIG. 16 is a view for illustrating one step of a manufacturing method of a magnetic head of the present invention.

For example, when the planar shape of the auxiliary yoke layer 121 is formed, instead of the film formation by sputtering using the resist pattern shown in FIG. 14, as shown in FIG. 16, the following may be performed. That is, a resist pattern is formed so as to expose an entire rear side portion (region having a width in the track width direction larger than the track width Tw) of the main magnetic pole layer 110, and the auxiliary yoke layer 121 is formed over the entire rear side portion of the main magnetic pole layer 110. In this case, the front surface 121a of the auxiliary yoke layer 121, which is overlapped with the front end portion (region having a width in the track width direction equal to the track width Tw) of the main magnetic pole layer 110, preferably has a curved shape.

Figure 17:
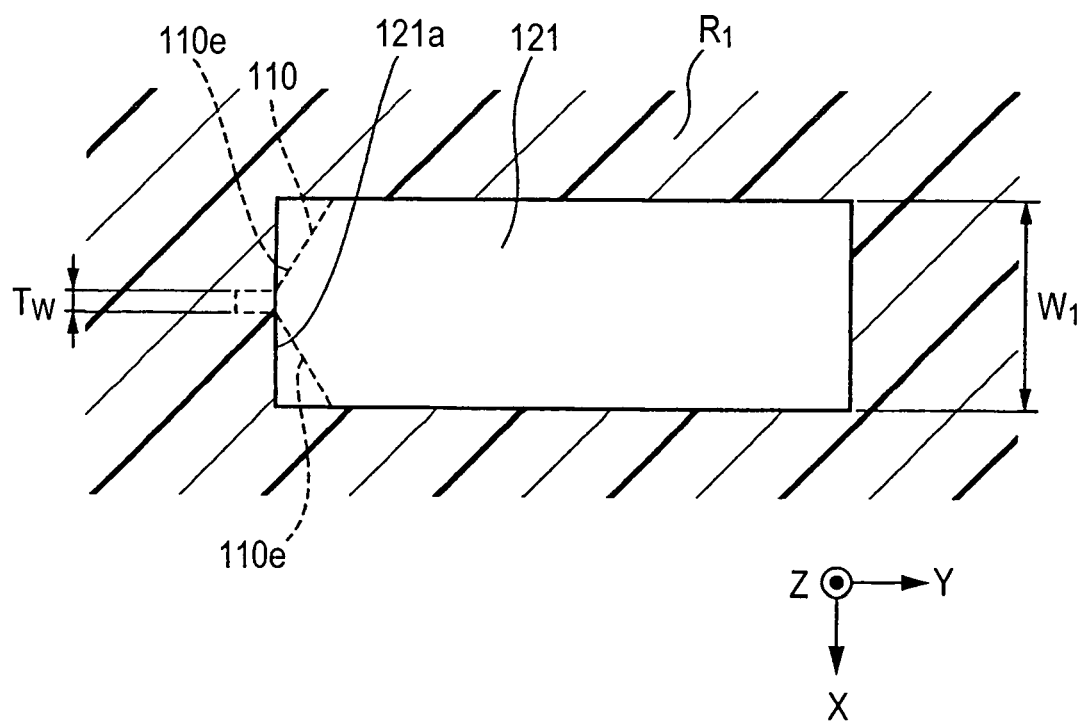
FIG. 17 is a view for illustrating one step of a manufacturing method of a magnetic head of the present invention.

Alternatively, as shown in FIG. 17, a resist pattern may be formed extending to the facing surface side past a front surface 110e of the rear side portion (region having a width in the track width direction larger than the track width Tw) of the main magnetic pole layer 110, followed by formation of the auxiliary yoke layer 121.

The width of the auxiliary yoke layer 121 in the track width direction (X direction in the figure) may be smaller than the maximum width of the main magnetic pole layer 110 in the track width direction.

Figure 18:
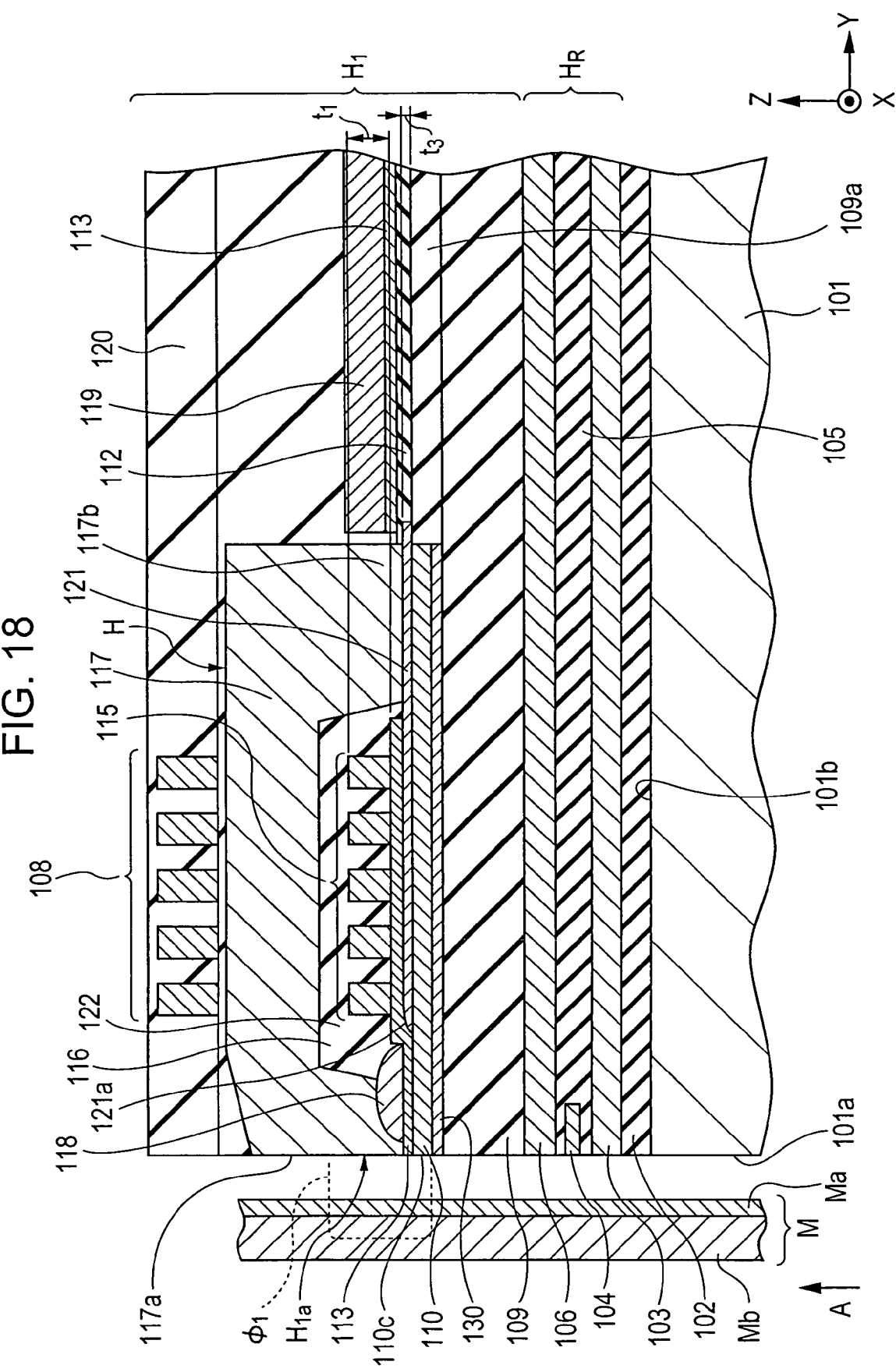
FIG. 18 is a vertical cross-sectional view of a magnetic head according to another embodiment of the present invention.

In addition, as shown in FIG. 18, by forming the second coil layers 108 above the return path layer 117, and connecting the second coil layers 108 and the first coil layers 115 at the respective end portions located in the track width direction (X direction in the figure), a solenoid coil layer may be formed in which the first coil layers 115 and the second coil layers 108 are wound around the return path layer 117. Also in the magnetic head shown in FIG. 18, the film thickness of the second coil layers 108 is larger than the film thickness of the first coil layers 115.

The above embodiments are described by way of example, and the present invention is not limited to those described above.

What is claimed is:

1. A perpendicular magnetic recording head comprising:
a first magnetic layer having a width, which determines a track width, in a track width direction at a facing surface facing a recording medium,
a second magnetic layer having a width, which is larger than the track width, in the track width direction at the facing surface facing the recording medium, the first magnetic layer being disposed under the second magnetic layer, and the first magnetic layer and the second magnetic layer being disposed in an element thickness direction with a space provided therebetween and being coupled to each other at a height direction side,
a plurality of first coil pieces provided in the space between the first magnetic layer and the second magnetic layer with predetermined intervals in the height direction and extending in a direction intersecting the first magnetic layer and the second magnetic layer;
a plurality of second coil pieces provided outside the space between the first magnetic layer and the second magnetic layer with predetermined intervals in the height direction and extending in a direction intersecting the first magnetic layer and the second magnetic layer, and
an auxiliary yoke layer including a magnetic material at an upper side of the first magnetic layer and in a space between the first magnetic layer and the second magnetic layer,
wherein front surfaces facing the recording medium of the first magnetic layer and the second magnetic layer are exposed at the facing surface facing the recording medium, a thickness of the front surface of the first magnetic layer is smaller than a thickness of the front surface of the second magnetic layer, a width in the track width direction of the first magnetic layer is smaller than a width in the track width direction of the second magnetic layer, an area of the front surface of the first magnetic layer is smaller than an area of the front surface of the second magnetic layer,
wherein a front portion of the second magnetic layer approaches to the first magnetic layer at facing surfaces side and faces to the first magnetic layer having a gap layer therebetween and a front surface of the auxiliary yoke layer is disposed behind a back surface of the second magnetic layer in a height direction,
wherein the first coil pieces are connected to each other at end portions thereof with the second coil pieces provided therebetween to be wound around the first magnetic layer so that a solenoidal coil is formed, and
wherein a film thickness of the second coil pieces is larger than a film thickness of the first coil pieces, and
wherein the auxiliary yoke layer has an inclined front surface or a curved front surface at the facing surface side, the height of the front surface being increased along the height direction
wherein the auxiliary yoke layer is formed of a material having superior corrosion resistance and containing less Fe than that contained in the first magnetic layer.

2. The perpendicular magnetic recording head according to claim 1,
wherein the auxiliary yoke layer functions as a corrosion preventing layer in the manufacturing process.

* * * * *